United States Patent
Dean

[15] 3,673,272
[45] June 27, 1972

[54] BLOCK COPOLYMERS OF SILICONES WITH VINYL PYRIDINE

[72] Inventor: John W. Dean, Averill Park, N.Y.
[73] Assignee: General Electric Company
[22] Filed: April 6, 1970
[21] Appl. No.: 26,081

[52] U.S. Cl.....................260/827, 117/123 D, 117/126 GN, 117/132 BS, 117/139.5 A, 260/825, 260/DIG. 16
[51] Int. Cl......................................C08g 47/10, CO8f 33/08
[58] Field of Search...................................260/827

[56] References Cited

UNITED STATES PATENTS

| | | | |
|---|---|---|---|
| 3,051,684 | 8/1962 | Morton et al. | 260/827 |
| 3,483,270 | 12/1969 | Bostick | 260/827 |

FOREIGN PATENTS OR APPLICATIONS

| | | | |
|---|---|---|---|
| 1,915,789 | 8/1969 | Germany | |

OTHER PUBLICATIONS

Chow et al., " Journal of Polymer Science," Vol. 27 (1958), pp. 569–571

Coleman et al., " Journal American Chemical Society," Vol. 77 (11–55), p. 5472–6

*Primary Examiner*—Samuel H. Blech
*Attorney*—Donald J. Voss, E. Philip Koltos, Frank L. Neuhauser, Oscar B. Waddell and Joseph B. Forman

[57] ABSTRACT

Block copolymers of silicones with vinyl pyridine having the formula:

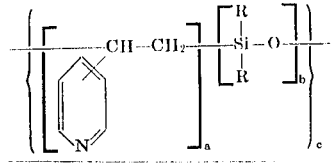

wherein $a$ is at least 25, $b$ is at least 10, $c$ is 1 or more, and R is selected from the class consisting of methyl and phenyl. The materials are useful for the formation of permselective membranes and allow the solubilization of silicones in a polar solvent.

5 Claims, No Drawings

BLOCK COPOLYMERS OF SILICONES WITH VINYL PYRIDINE

BACKGROUND OF THE INVENTION

Copolymers of organopolysiloxanes with various materials have previously been formed. Included among these materials are block copolymers of organopolysiloxanes with resinous materials, such as polystyrene. In general, such materials have been formed for the peculiar surface-active properties which the copolymers possess.

However, to date, organopolysiloxanes having reactive, polar blocks have not been prepared. Formation of such a block copolymer provides particular advantages because of the polarity of the reactive, polar block, compared with the non-polarity of the organopolysiloxane segment. Such materials would prove valuable as surfactants because of the combination of high and low polarities and, employing vinyl pyridine as the block along with the organopolysiloxane, would prove useful as permselective membranes because of the ionic bonding which can be created.

SUMMARY OF THE INVENTION

In accordance with the present invention, block copolymers of organopolysiloxanes with vinyl pyridine have been formed, these block copolymers having the formula:

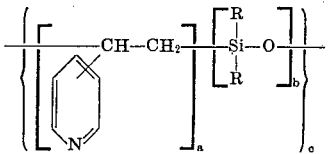

where each R is independently selected from the class consisting of methyl and phenyl, $a$ is at least 25, $b$ is at least 10, and $c$ is 1 or more.

In the formula above, there are preferably at least 15 of the vinyl pyridine groups in each block, as indicated by the defination of $a$. Most preferably, there are from 50 to 500 of these units in each block. Similarly, while at least 10 diorganosiloxy units are present in each block, most preferably there are from 10 to 500 of these units in each block.

An effective copolymer is formed with a single block of vinyl pyridine units and a single block of diorganosiloxy units. However, improved results for many uses can be obtained by repeating blocks of these units and, preferably, there are from three to 10 repeats of vinyl pyridine and diorganosiloxy blocks. It is, of course, recognized that the length of each individual block within these recurring blocks is not necessarily equal.

Generally, the chain terminals of the block copolymer can be formed of a variety of substituents. For example, the chain terminal can be an alkali metal silanolate of formula — $SiR_2OM$, where M is the alkali metal and R is as previously defined. Additionally, the chain terminals can be reactive groups of the type generally employed in room temperature vulcanizing organopolysiloxane compositions, as are well known in the art.

DESCRIPTION OF THE PREFERRED EMBODIMENTS

As previously indicated, the block copolymers of the present invention may include those having single blocks of vinyl pyridine polymer and single blocks of diorganopolysiloxanes, or may contain repeating blocks of the vinyl pyridine polymer and diorganopolysiloxane. The first referenced groups, are those of formula:

$$A — B, \quad (1)$$

where A represents the diorganopolysiloxane unit, and B represents the vinyl pyridine polymer segment. As indicated in the generic formula, A represents repeating units of formula:

where each R is independently selected from the class consisting of methyl and phneyl. As further indicated by the subscript $b$, there are at least 10 of these diorganosiloxy units in a group, and, preferably, there are from 10 to 500 units in the organopolysiloxane block.

The organopolysiloxane portion of the block copolymer is formed by polymerization of cyclic organopolysiloxanes, such as hexamethylcyclotrisiloxane, octamethylcyclotetrasiloxane, decamethylpentasiloxane, and hexaphenylcyclotrisiloxane. Preferably, when the substituents on the silicon atoms are methyl, the hexamethylcyclotrisiloxane is employed.

The vinyl pyridine portion of the block copolymer is formed through polymerization of vinyl pyridines of formula:

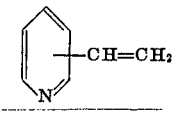

As indicated by the formula, the position of the vinyl group on the pyridine ring is not critical. For example, 2-vinyl pyridine and 4-vinyl pyridine can be equally effectively employed.

As indicated by the general formula, other polyvinyl pyridine-organopolysiloxane block copolymers can be formed, including those of formula ABA and $(ABA)_x$, where A and B are as previously defined, as indicated in the general formula. When compounds of the ABA and $(ABA)_x$ type are to be formed, reaction must start with preparation of the vinyl pyridine block of the copolymer.

The vinyl pyridine block is prepared in a solvent, preferably a mixture of tetrahydrofuran and toluene. With the tetrahydrofuran and toluene mixture, from 20 to 100 percent of the solvent is generally tetrahydrofuran. In addition to these solvents, other solvents which may be employed include ethers, such as glyme and diglyme, and aromatic hydrocarbons which are otherwise inert to the reaction. The difficulty with using ethers, other than tetrahydrofuran, is that there is more difficulty in purifying the final reaction mixture.

An alkali metal catalyst is employed to provide terminals on the vinyl pyridine polymer for bonding with the organopolysiloxane blocks. Preferably, the alkali metal is lithium and the compound is an organic alkali metal compound, such as dilithium naphthalene. Other alkali metal organic compounds are shown, for example, in U.S. Pat. No. 2,975,160 — Zelinski, issued Mar. 14, 1961. The lithium, or other alkali metal compound, must be one with two alkali metal constituents, in order to function most efficiently in the process. The dilithium organocompound reacts with the vinyl pyridine to form chains which are terminated with positively charged lithium ions. This vinyl pyridine chain, with the positively charged lithium ion terminals, may then be reacted with the silicone material to form the polyorganosiloxane blocks. Of course, when a block copolymer of form AB is to be produced, then the organolithium compound, or other organic compound having an alkali metal constituent, may have a single such constituent.

While the organolithium compound functions, essentially, as a catalyst, it also aids in determining the length of the vinyl pyridine block which will form. Generally, there should be at least 0.002 part of the organolithium compound for each 100 parts of the vinyl pyridine to be polymerized. Most preferably, the catalyst level is from 0.01 to 0.1 part of the organolithium compound for each 100 parts of the vinyl pyridine to be polymerized.

The amount of solvent employed should be sufficient to dissolve each of the reactants during the reaction. Preferably, the concentration of the vinyl pyridine in the solvent is from about 25 to 30 percent.

After polymerization of the vinyl pyridine with the organolithium compound, the silicone materials are added in order to form the organopolysiloxane block. The organopolysiloxane block is preferably formed by reaction of cyclic organopolysiloxanes, such as, hexamethylcyclotrisiloxane, octamethylcyclotetrasiloxane, decamethylcyclopentasiloxane, and hexaphenylcyclotrisiloxane. Of course, mixtures of these materials can be employed in forming the organopolysiloxane blocks. Preferably, when dimethylsiloxy blocks are to be included, the reactant is hexamethylcyclotrisiloxane. The silicone material is generally added to the previously formed vinyl pyridine block in the same solvent as has been employed for forming the vinyl pyridine block. Reaction of the vinyl pyridine, in the presence of the organolithium, or other alkali metal material, generally takes place at about 50° C., with reaction requiring about 2 to 3 hours. The same temperature is generally maintained on addition of the silicone material, while reaction may be completed in 5 hours or less.

If the block copolymer formed is to be one of the AB or ABA type, then following reaction of the silicone material, the positively charged lithium ions, which are now found at the end of the organopolysiloxane blocks, are removed and the terminals are generally of the type employed in room temperature vulcanizing organopolysiloxane compositions, as are well known in the art, by means known in the art.

If the block copolymers formed are to be of the $(ABA)_x$ type, then the lithium silanolate terminals remain and the compound is reacted with difunctional organosilicon material, such as diphenyldiacetoxysilane. The lithium ion reacts with the acetoxy moiety of the diphenyldiacetoxysilane, and is thus removed from the polymer. The silicone blocks of the polymer are joined by a diphenyl siloxy group through this reaction and, thus, the length of the organopolysiloxane block is, essentially, doubled. This reaction generally requires about 5 hours at a reaction temperature of about 50° C.

The various block copolymers are removed from the solvent solution and purified, through precipitation in a non-solvent. Non-solvents for this purification include water, which acts to remove the soluble lithium acetate which may have formed in the reaction mixture, and higher alkanols, such as, propanol, butanol, amyl alcohol, etc. The now precipitated block copolymer is recovered by filtering from the solvent mixture.

In order that those skilled in the art may be better enabled to produce the products of the present invention, the following examples are given by way of illustration, and not by way of limitation. All parts in the following examples are by weight, unless otherwise indicated.

EXAMPLE 1

An ABA type block copolymer was prepared according to this example. Each of the raw materials employed in the reaction was purified prior to reaction. The toluene solvent was distilled from sodium and the tetrahydrofuran solvent from lithium-naphthalene. The hexamethylcyclotrisiloxane was resublimated under reduced pressure, while the 2-vinyl pyridine was redistilled under reduced pressure.

Into a reaction vessel a quantity of 260 parts toluene and 175 parts tetrahydrofuran were charged a quantity of 290 parts of a 0.5 molar dilithium napthtalene solution was added to this solvent mixture and the mixture was stirred and chilled with an ice water mixture. Over the next 3 hours, 85 parts 2-vinyl pyridine were added in small quantities resulting in a red-black, apparently homogeneous mixture. A solution of 60 parts of hexamethylcyclotrisiloxane contained in 130 parts of the same toluene-tetrahydrofuran mixture, was added, and the reaction mixture heated to 60° C. and held at that temperature for a period of 3 hours. The color gradually disappeared from the solution, the mixture ultimately becoming a viscous, opaque, off-white mass with a slight violet tinge. The mixture was cooled to room temperature and treated with 1 part of acetic acid in order to provide silanol chain terminals on the copolymer. The mixture was then poured into water so as to precipitate the copolymer from the solvent mixture and the resulting product was a sticky, white crumb which dried to an off-white brittle solid. The copolymer was found to be insoluble in hexane and in toluene. As evidenced by the method of recovery, the polymer was insoluble in water, but could be solubilized with dilute mineral acid, to a hazy solution. When this solution was treated with an inorganic base, the polymer precipitated. This solubilization and desolubilization effect is demonstrative of the solubilizing effect of the pyridine portion of the copolymer. The polymer had an intrinsic viscosity of 0.29 dl./g., when measured at 25° C. in methyl ethyl ketone. The copolymer had a structure consistent with the formula:

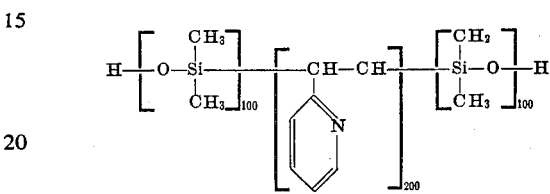

EXAMPLE 2

Reaction is carried out in the same manner as set forth for Example 1, except that 65 parts of 4-vinyl pyridine are used in place of the 2-vinyl pyridine, and 80 parts of hexaphenylcyclotrisiloxane are employed in place of the hexamethylcyclotrisiloxane. The resulting material had a structure consistent with the formula:

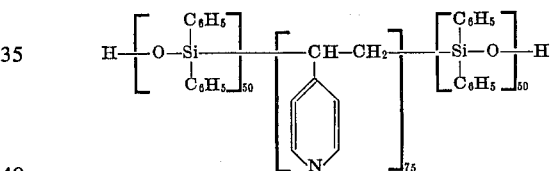

In addition to employing, singly, hexamethylcyclotrisiloxane and hexaphenylcyclotrisiloxane, mixtures of these two cyclic siloxanes can be employed to form a copolymer having mixed dimethylsiloxy and diphenylsiloxy groups.

Following formation of the block copolymer of vinyl pyridine and diorganosiloxy units, the copolymer can be treated with alkylating agents to convert the pyridine nitrogen atoms to positively charged quaternary nitrogen cations, thus increasing the polarity of the vinyl pyridine portion of the copolymer and, thus, its compatibility with polar solvents. The quaternized pyridine portion can be treated with various reagents, including alkylating agents and acids, in order to introduce other substituents into this portion of the molecule, thus forming copolymers of formula:

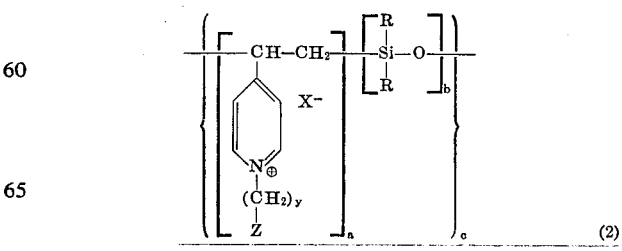

where R, $a$, $b$ and $c$ are as previously defined, X is a halogen radical, Z is an organofunctional substituent compatible with the vinyl pyridine system, and $y$ is from 1 to 12. The radicals represented by X can include, for example, chlorine and bromine.

The radicals defined by Z can be, for example, an ester or acyloxy group. Such a group provides reactivity, in addition to polarity, to this portion of the polymer and thus allows for other reactions and interactions, as are well known in the art. The alkylating agents which may be employed include inorganic acids and other means of quaternization, known to the art. If the quaternizing agent is an alpha, omega-alkylene dihalide, then the block copolymer may be cross-linked through the vinyl pyridine portion, and because of the form of the copolymer, the cross-link density will be very high.

In order to form copolymers as illustrated in the generic formula

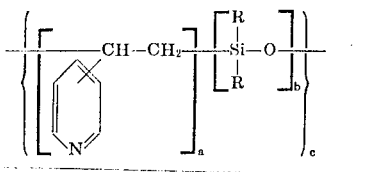

where $c$ is 2 or more, the polymer formed as in Examples 1 and 2, is not recovered after reaction of the cyclotrisiloxane to form the initial block copolymer, not is this material reacted with acetic acid in order to form the silanol chain terminals. Rather, the polymer is left in solution and a quantity of diphenyldiacetoxysilane is added. This material is reacted at about 50° C. for about 5 hours in order to form the block copolymer of repeating units. Thus, a small quantity of diphenyldiacetoxysilane is added to the material produced according to Example 2. This material is then treated with acetic acid and recovered in the same manner as recovery of the polymer in EXAMPLE 1 to form a block copolymer of repeating units of formula:

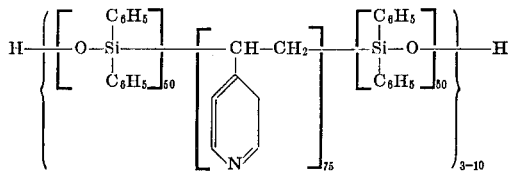

Thus, in effect, the copolymer contains from three to 10 groups of 75 4-vinyl pyridine units polymerized, the successive polyvinyl pyridyl blocks being interrupted by blocks of 100 diphenylsiloxy units, with the polymer terminated by 50 unit blocks of diphenylsiloxy units, and the chain ultimately terminated by diphenylsilanol groups. Such block copolymers have greater strength and elongation than the simple ABA block copolymers. Of course, these repeating unit block copolymers may also be treated with quaternizing agents in order to provide various advantages, as previously set forth for the materials shown in Formula (2). Similarly, the chain terminals on these repeating unit block copolymers may have standard chain terminals as are applied to organopolysiloxane room temperature vulcanizing compositions.

The materials formed according to the present invention are useful as additives to organic plastics, as anti-static treatments for textiles, as additives to silicones, as surfactants in polymeric and non-polymeric systems, as glass-fiber and textile sizes, as primers in surface treatments for metallic and non-metallic materials, the latter including concrete, and for the synthesis of elastomeric membranes containing polar functionality, such as would be employed in permselective membranes.

The terminal groups employable for room temperature vulcanizing compositions may include, for example, acyloxy terminals, silanol terminals, amine terminals, silicon hydride terminals, silicon-vinyl terminals, and other terminals of the type which may be caused to react so as to increase polymer length at room temperature, often upon exposure to atmospheric moisture. Such systems are well known in the art and are taught, for example, in U.S. Pat. No. 2,843,555 — Berridge, U.S. Pat. No. 3,127,363 — Nitzsche, and French Pat. No. 1,137,495, assigned to the same assignee as the present invention.

While various formulas have been specifically described in this specification, it will be understood that the invention is not so limited, but encompasses the various formulas included in the appended claims.

What is claimed as new and desired to be secured by Letters Patent of the United States is:

1. A block copolymer of vinyl pyridine and diorganosiloxy units having the formula:

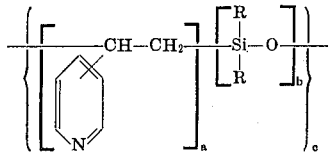

where each R is independently selected from the class consisting of methyl and phenyl, $a$ is at least 25, $b$ is at least 10, and $c$ is 1 or more.

2. The block copolymer of claim 1 wherein $a$ is 50 to 500, and $b$ is from 10 to 500.

3. The block copolymer of claim 2 wherein $c$ is from 3 to 10.

4. The block copolymer of claim 1 wherein the vinyl pyridine moiety is 2-vinyl pyridine.

5. The block copolymer of claim 1 wherein R is methyl.

* * * * *